United States Patent

Longsderff et al.

[15] 3,702,408

[45] Nov. 7, 1972

[54] MULTI-CONVERTER THERMIONIC ENERGY MODULE

[72] Inventors: Richard W. Longsderff, Lancaster; Robert Shirk Sheetz, Elizabethtown, both of Pa.

[73] Assignee: The United States of America as represented by the United States Atomic Energy Commission

[22] Filed: Nov. 3, 1970

[21] Appl. No.: 86,577

[52] U.S. Cl. .......................................310/4, 165/105

[51] Int. Cl. ...........................................H01j 45/00

[58] Field of Search ..........................310/4; 165/105

[56] References Cited

UNITED STATES PATENTS

| | | | |
|---|---|---|---|
| 3,368,084 | 2/1968 | Hall | 310/4 |
| 3,176,165 | 3/1965 | Lawrence | 310/4 |
| 3,113,091 | 12/1963 | Rasor et al. | 310/4 |
| 3,079,515 | 2/1963 | Saldi | 310/4 |
| 3,211,930 | 10/1965 | Clement et al. | 310/4 |

*Primary Examiner*—D. F. Duggan
*Attorney*—Roland A. Anderson

[57] ABSTRACT

Vacuum-cast method for dielectric bonding of refractory metals for providing an aluminum oxide electrical insulator between concentric molybdenum cylinders for forming a trilayer sandwich construction. The trilayers are employed in thermionic diodes that are stacked on a heat pipe in a series connected network in a single cesium filled envelope. Interconnecting slotted leads provide axial flexibility between the diodes in a multi-converter, thermionic energy module.

6 Claims, 3 Drawing Figures

INVENTORS.
RICHARD W. LONGSDERFF
ROBERT S. SHEETZ

INVENTOR.
RICHARD W. LONGSDERFF
ROBERT S. SHEETZ

INVENTORS.
RICHARD W. LONGSDERFF
ROBERT S. SHEETZ

MULTI-CONVERTER THERMIONIC ENERGY MODULE

BACKGROUND OF THE INVENTION

This invention was made in the course of or under a contract with the United States Atomic Energy Commission.

In the direct production of electrical power from variable heat energy, thermionic diodes having heat pipe input means are advantageously employed. FIG. 1 of U.S. Pat. No. 3,279,028 by Hall et al, shows one such thermionic diode, but this diode requires the bonding of a thermionic emitter to the outside of the heat pipe, which involves difficult problems in connecting a series of diodes along the heat pipe, or in providing axial flexibility between such series connected diodes. Moreover, the process required for the bonding described in this Hall et al patent, has a dielectric at the surface of a capillary formed along the outside of a horizontally arranged heat pipe. It is advantageous, therefore, to provide an improved method for fabricating the dielectric, bonding it to a refractory metal, and forming thermionic diodes in series around heat pipes. It is also advantageous to provide an improved thermionic, multiconverter module having improved series connected diodes and flexible leads therefor.

SUMMARY OF THE INVENTION

This invention provides an improved method for dielectric bonding of refractory metals. More particularly, this invention provides an improved dielectric and means for bonding it between two concentric refractory metal cylinders for forming an improved trilayer construction. In this regard, this invention provides a vacuum casting method for fabricating a specific trilayer sandwich construction for thermionic diodes having a heat pipe energy input means. As such, this invention is an improvement on the method of the above-mentioned Hall et al. patent. This invention also provides an improved multi-converter module having a stack of thermionic diodes connected in a series network by a lead that provides axial flexibility between the diodes. In another aspect, this invention provides specific thermionic diode elements for effectively controlling thermal conductance and electrical output efficiencies. In still another aspect, this invention provides thermionic diodes having arc suppression means.

The above and further objects and novel features of this invention will become apparent from the following detailed description of one embodiment of this invention when the same is read in connection with the accompanying drawings, and the novel features will be particularly pointed out in the appended claims.

BRIEF DESCRIPTION OF THE DRAWINGS

In the drawings, where like elements are referenced alike.

DETAILED DESCRIPTION OF THE INVENTION

Figure 1:
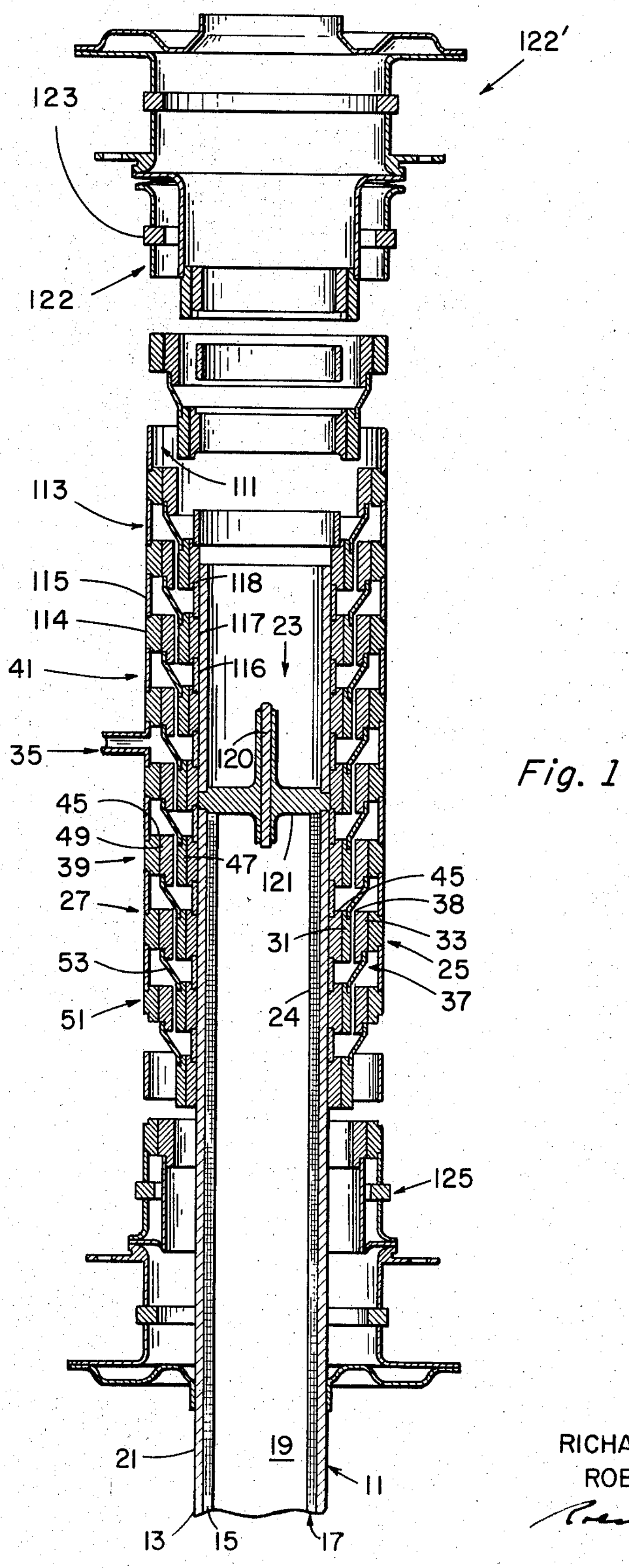
FIG. 1 is a partial cross-section of one embodiment of the improved multi-converter thermionic module of this invention.

This invention is useful in providing an improved thermionic diode for directly converting heat pipe energy to electricity. As such, this invention is useful in converting heat to electricity from a wide variety of heat energy sources, such as electrical heat sources, natural heat sources, fossil fuel heat sources, and atomic energy heat sources. Moreover, the method of this invention is useful in providing mechanical integrity in a trilayer sandwich construction. In this regard, this invention is particularly useful in forming an insulator for a series of thermionic diodes on a heat pipe, comprising any of the wide variety of heat pipes or heat ducts known heretofore. In the example of the embodiment of this invention described in more detail hereinafter the heat source is a nuclear heat source, such as any of the nuclear reactors or radioisotope heat sources known in the art.

Heat pipes and heat ducts are well known in the art, as described in the above-mentioned patent to Hall et al. The theory of heat pipes is discussed in LA-3246-MS, Los Alamos Scientific Laboratory, 1965, and Scientific American, Volume 218, No. 5. The theory of constant temperature heat pipes is discussed in the RCA progress reports under AEC Contract AT(30-1)-4161. In its simplest form, a heat pipe, such as the substantially constant temperature heat pipe 11 shown in FIG. 1, comprises a normally metallic closed container 13, employing on the inner surface 15, a capillary structure 17 that is substantially saturated with a vaporizable heat transfer fluid 19, such as sodium, lithium, mercury etc. As is well known in the art, heat pipe 11 involves suitable reservoirs for vaporization condensation cycle for transferring heat substantially isothermally from one point even adjacent a variable heat energy output heat source (not shown for ease of explanation), to another point on external heat transfer surface 21 of closed container 13, e.g. end 23 heat pipe 11, by a vaporization-condensation cycle. A vast majority of the heat pipes fabricated to date, contain foraminous or wire-screen wicks, such as wick 24, as the capillary structure 17. In this regard, the wicks generally extend throughout the length of the heat pipe. However, as will be understood in more detail hereinafter, various internal heat pipe structures are useful in connection with this invention, so long as the heat pipe has an external heat transfer surface 21, which will be understood as being the external heat transfer surface formed by closed container 13. Accordingly, this invention utilizes the external heat transfer surface 21 of a heat pipe 11, such as described in the above-mentioned Hall et al. patent.

Advantageously, the operating temperature of the vaporizable heat transfer fluid 19 in heat pipe 11 is high for the operation therewith of thermionic diodes, such as diodes 25 of this invention, for the direct conversion of the heat energy, which is transported by the vaporizable heat transfer fluid 19 in heat pipe 11, to an electrical current by the diodes 25. One convenient operating temperature for a combination converter 27 formed by heat pipe 11 and diodes 25, involves a vaporizable heat transfer fluid 19 having a temperature of about 1450° C, for producing a temperature only slightly less at the external heat transfer surface 21 of the closed container 13 of heat pipe 11. This is the operating temperature of the example of the embodiment of this invention described herein, but as will be understood from the following by one skilled in the art, this operating temperature of this vaporizable heat transfer fluid 19 may be selectively controlled to operate any of a wide range of temperatures.

The heat pipe design established for this invention and used as a basis for sizing the other module elements, involves in one embodiment, a 14 volt, 600 watt, (30 converter 4 watt $cm^2$, 5 $cm^2$ converter,) module system, while a 28 volt module system is also possible in another embodiment.

The heat pipe 11 design for the 14 volt module system has a geometry of 0.860 inch diameter × 26 inches overall length. The gross heat throughput is approximately 8.5 kilowatts based on the preliminary module design previously described. This is based on a converter efficiency of 10 percent and miscellaneous losses of 2.5 kilowatts. The theoretical maximum power throughput capability of the heat pipe 11 of the embodiment of this invention described herein is 12 kilowatts.

Advantageously, a plurality of diodes 25 are arranged in series on the outside external heat transfer surface 21 of heat pipe 11 for heating a series of emitters 31, whereby a series of collectors 33 spaced from the emitters 31 cause a desired electrical current and voltage to be available at the external terminals 35, one of which terminals is shown for ease of explanation. Advantageously, a conventional vapor 37, such as cesium, is confined in an annular interelectrode space 38 between the emitters 31 and the collectors 33 to neutralize the space charge therebetween.

The voltage output from each diode 25 is about 1 volt, so that three series arranged diodes 25 will produce an output of up to about 3 volts and ten of these diodes 25 will produce an output of up to about 10 volts. The embodiment described herein contemplates a module having 10 converter sections, each having an emitter area of 5 $cm^2$. The actual module performance is 200 watts at an output potential of at least 5 volts, but by varying the load impedance voltages of at least 8 volts are attained. In this regard, emitters 31 are arranged around the external heat transfer surface 21 of heat pipe 11 and are electrically insulated from the heat pipe 11 in order effectively to provide the above-mentioned voltages by the stacking of the diodes 25 in a series arrangement 39, such as provided by the multi-converter module 41 of this invention. This invention provides the mentioned diodes 25, series arrangement 39, multi-converter module 41, and heat pipe thermionic-diode-converter combination 27, by employing a dielectric forming a specific insulator 45 that is strongly bonded in a trilayer sandwich construction between two molybdenum cylinders 47 and 49.

The key to this insulator 45 and its bonding in the mentioned trilayer sandwich construction, is provided by the vacuum casting method of this invention. Advantageously to this end, this invention vacuum casts an aluminum oxide insulator 45 between two concentric cylinders 47 and 49. The cylinders are advantageously molybdenum or a TZM alloy of titanium, zirconium and molybdenum. As will be understood in more detail hereinafter, the diodes 25 are prefabricated in trilayer sub-assemblies, shown in FIGS. 1 and 2. These sub-assemblies are stacked on the described, common, central heat pipe 11, such as a decaying radio-isotope powered heat pipe 11, and the output potential of the multi-converter module 41 of this invention can be varied by the addition or deletion of diodes 25. Thus, this invention involves specific trilayer bonding for a specific converter 27 having a specific multi-converter module 41, as described in more detail hereinafter. In this regard, it is noted that this module also involves specific flexible leads 53 as shown in FIG. 2, as also described in more detail hereinafter. However, the specific trilayer bonding method and insulator 45 of this invention can be employed more widely, such as in the variety of applications where there is a need for such dielectric bonding of refractory metals.

Figure 2:
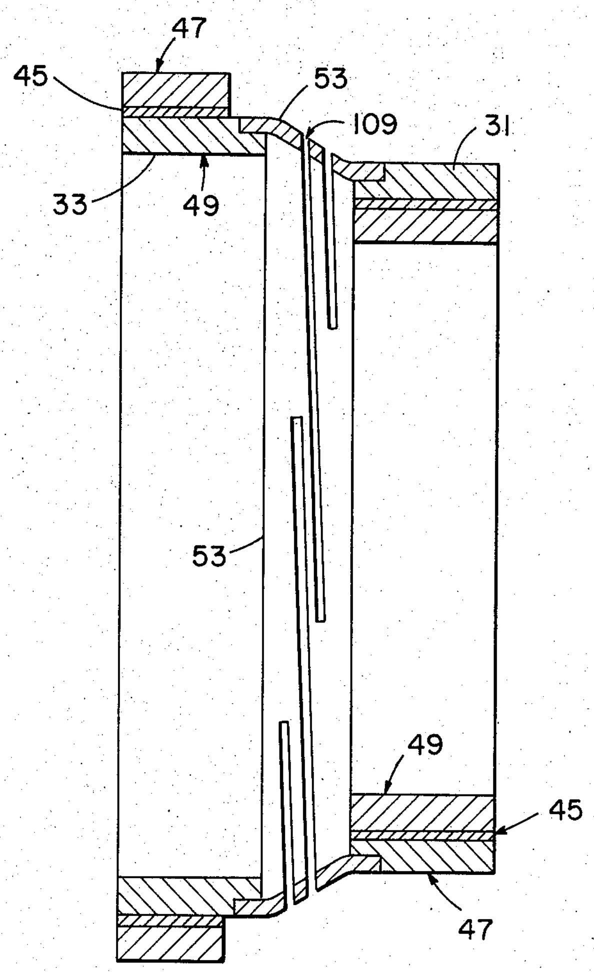
FIG. 2 is a partial cross-section of the thermionic diodes of this invention showing in an enlarged illustration of the apparatus of FIG. 1, the details of the flexible, series connected leads of this invention.
Figure 3:
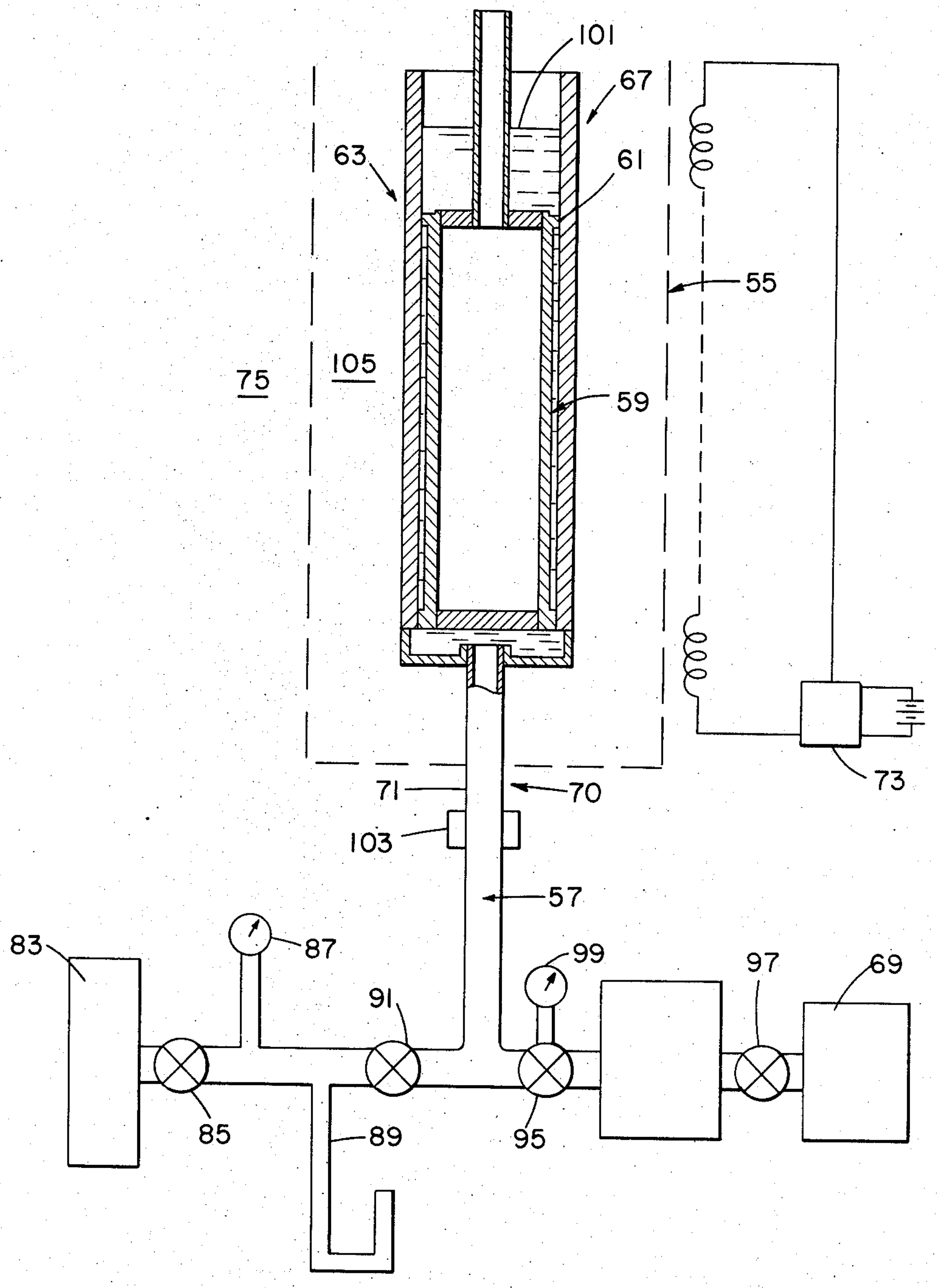
FIG. 3 is a partial schematic drawing of the apparatus for performing the improved method of this invention wherein vacuum casting is used to provide an electrical insulator in a sandwich, trilayer construction for use, for example, between the heat pipe and emitter of FIG. 1 for providing the improved multi-converter, thermionic module of this invention.

An actual example of the vacuum casting technique of this invention is illustrated in FIG. 3, for the fabrication of the diodes 25 and sub-assemblies 51 shown in FIGS. 1 and 2. Liquid aluminum-oxide, which is made molten by heating in a conventional furnace 55 having an 80 percent $H_2$-20 percent He atmosphere 57 therein, is drawn into a 0.005 inch wide annulus 59 between the concentric cylinders 47 and 49. These cylinders 47 and 49 are precisely machined with an extension 61 projecting from ends 63 of cylinders 47 and 49 to maintain the desired 0.005 inch wide annulus 59 therebetween. Solid $Al_2 0_3$ is placed adjacent the top ends 63, and this described assembly of cylinders 49 and 51 is fired in the mentioned hydrogen/helium atmosphere 57 (80% $H_2$–20% He) to a temperature of 2075° C. When melting of the solid $Al_2 0_3$ occurs, pressure at the liquid-solid interface 67 is removed by actuating a suitable vacuum pump 69, and the area in annulus 59 is evacuated to force the liquid $Al_2 0_3$ into this annulus 59 under atmospheric pressure. The process terminates when the liquid $Al_2 0_3$ reaches the colder section 70 of molybdenum exhaust tubing 71, and thereby solidifies there.

The temperature of furnace 55 then slowly is reduced to 1900° C by adjusting the control 73 for furnace 55, and the remaining temperature drop to room temperature in ambient 75, occurs rapidly enough to produce a clear alpha phase alumina insulator 45. Cutting away of the extensions 61 then leaves two concentric cylinders 47 and 49, which are electrically insulated from each other, and thermally bonded to each other by a specific insulator 45 to form a cast sub-assembly 51. This sub-assembly 51 is fabricated into diodes 25 as described in more detail hereinafter.

In the operation of the described example of the method of this invention, helium from reservoir 83 flows through valve 85, as indicated by flow gauge 87 at a pressure indicated by mercury manometer 89 as illustrated in FIG. 3. Valves 91 and 85 control this flow and pressure to obtain the desired atmosphere in annulus 59 formed between cylinders 47 and 49. Valves 85 and 91 close and valves 95 and 97 open, whereby vacuum pump 69 maintains the desired vacuum as indicated by gauge 99, in the annulus 59, which is arranged vertically on the common axis of cylinders 47 and 49. Furnace 55 heats the $Al_2O_3$ at the top of the furnace 55 to form a liquid 101 of $Al_2O_3$ that is forced downward through annular space 59 by atmospheric pressure, while heat sink 103 maintains the desired heat differential between the inside 105 of furnace 55 and the room temperature ambient 75. The liquid $Al_2O_3$ is forced downwardly under pressure toward the relatively colder portion 70 of tube 71 below the bottom portion of annulus 59, and the aluminum oxide there begins to cool at this colder section 70 of molybdenum exhaust tubing 71.

Tests, designed to evaluate the effect of temperature on the casting quality, showed that higher temperature (2080° C or greater) heretofore produced void areas or small bubbles in the alumina insulator 45. It is believed that these void areas developed when sporadic, uneven flow (due to lower alumina viscosity) encapsulated gas pockets in the heretofore known capillary.

In contrast, in accordance this invention, the back pressure is controlled to provide adequate support of the fluid alumina, but not great enough to introduce bubbles in the alumina. This optimum back pressure is somewhat dependent upon the orifice geometry at the entrance thereto. Large area openings make it difficult to support the liquid alumina until melting is complete. An orifice formed by the slip fit of the two cylinders 47 and 49, however, aids in the support of the fluid but limits the flow of the liquid. An orifice design of eight flats, therefore, equally spaced on an inner molybdenum cylinder provides adequate orifice geometry in accordance with this invention.

Following the development of the satisfactory casting technique of this invention, electrode assemblies were fabricated using cast assemblies produced by this technique. Electrode assemblies were fabricated by cutting sections, approximately one-quarter inch in length, from the cast assembly. These sections are cut using an abrasive cutting wheel, such as Allison No. GC 120 or Beuhler No. 4110, to prevent chipping or pull-out of the alumina in the trilayer. Most sections exhibit an impedance of 1000 ohms or greater following initial cutting. Hydro-blasting removes undesirable metal. Since cast sections not completely free of voids can produce voltage stand-off, cast sections completely free of voids are desirable.

Machining of the trilayer assembly also involves the avoidance of voids in the alumina since these voids cause pull-out or chipping of the alumina. In this regard, spongy porous alumina chips out in ragged edges when machined, whereas solid non-porous alumina can be machined to dimension with little or no chip-out. Voltages, up to 50 volts DC, can be applied across the trilayer at 1500° C without voltage breakdown when the alumina is free of voids.

To form the sub-assembly of this invention, the emitters 31 and collectors 33 are machined from cast sub-assemblies 51 and welded by conventional electron beam welding techniques long well known in the art, to flexible interconnecting leads 53, such as the slotted molybdenum leads 53 of the type shown in FIG. 2, to provide axial movement and differential expansion between the hotter emitters 31 on the ID and the cooler collectors on the OD of the diodes 25 of multi-converter module 41. These slots 109 optimize the area-to-length ratio of the leads 53 to make available an adequate cross-sectional area for electrical conductivity at as low a thermal drain as possible, thus to enhance the efficiency of combination converter 27.

The interelectrode lead 53 for operation of a 1450° C emitter, was optimized by employing 0.005 inch thick molybdenum having six 0.85 inch long slots 109, 0.015 inch wide. The slots 109 spiral to overlap each other by approximately 50 percent. Electrical discharge cutting techniques are used to cut the slots 109. A plurality of diode sub-assemblies are stacked in series with connecting leads 53 therebetween to form with heat pipe 11 the multi-converter module 41, as shown in FIG. 3. This provides the inherent advantage that the number of diodes 25 can be varied to accommodate a particular design voltage.

The modular approach of the method of this invention, also contemplates an arc suppression coating 111 on the adjacent electrode surfaces to prevent arc-over therebetween at potentials above the ionization potential, e.g. for cesium vapor 37 of 3.89 volts in envelope 113, this being a requirement because of the high output of the multi-converter, series connected diodes 25 of this invention. One suitable coating, comprises a Spr/Sin deposited coating of aluminum oxide at a firing temperature of 1800° – 1820° C in an $H_2$ atmosphere for 5 minutes.

An "enamel" type coating suitable for application to the molybdenum and capable of operating at up to 1500° C in a cesium atmosphere is required for this arc-suppression. Also, it must withstand thermal cycling from ambient to maximum temperature and present an electrical resistivity of not less than $1 \times 10^3$ ohm-cm at maximum temperature. Additionally, a sufficient (0.001 – 0.003 inch) coating is advantageous because of the probability that thermal expansion gradients could cause cracking or crazing if too thick and bare spots could occur if too thin.

In the operation of the described converter 27, a suitable nuclear heat source heats a suitable vaporizable heat transfer fluid 19, such as lithium, in heat pipe 11. This vaporizable heat transfer fluid 19 circulates in the heat pipe 11 to carry heat from the heat source to end 23 of heat pipe 11, thereby to heat the emitters 31 to produce thermionic electrons in the annular interelectrode space 38 between emitters 31 and collectors 33. Meanwhile, the cesium vapor 37 in this annular interelectrode space 38, which is contained in a single cesium filled envelope 113, neutralizes the space charge between the emitters 31 and collector 33.

The envelope 113 is formed by molybdenum cylinders 114 bonded to the OD of collectors 33 by insulators 45. These cylinders 114 have spacers 115 arranged in between the cylinders 114 and connected thereto by electron beam welding or copper braze end assembly techniques. In the case of the latter, the braze is made by RF in a vacuum on the collector side where the braze is shielded from the electrode surfaces.

The flexible, slotted leads 53 connect the diodes 25 in series, and the slots 109 permit the communication of the cesium vapor 37 between all the interelectrode annular spaces 38 between the emitters 31 and collectors 33 of series connected diodes 25.

Ceramic, e.g. alumina coated, insulating spacers 116 separate the diodes 25 along heat pipe 11. The design criteria of the high voltage module of this invention necessitates use of high strength alumina coated ring spacers 116 for spacing the electrode assemblies. These spacers 116 also aid in shielding of adjacent areas having a difference in potential. The ceramic coated spacers 116 are located between the adjacent emitter assemblies during assembly of the module components on the heat pipe 11. Ceramic spacer tolerances of 0.002 inches at 1500° C are adequate to accommodate the inherent difference in thermal expansion between the molybdenum heat pipe and emitter section versus the spacers 116. Molybdenum cylinders 117, which are arranged on external heat transfer surface 21, are bonded by insulators 45, which are fabricated by the described process, to emitters 31 on the ID of the latter. These cylinders 117 fit on external heat transfer surface 21 of heat pipe 11 and have shoulders 118 for the alumina coated molybdenum spacers 116. Plug 120 in partition 121 seals off the end 23 of heat pipe 11, which is processed in a vacuum and filled with a vaporizable fluid 19 that is sealed therein under pressure in an inert atmosphere.

The basic assembly of module 41 employs the described complete sub-assemblies 51, which are machined to close tolerance after electron beam welding and brazing respectively on the heat pipe 11. All closures are made by electron beam welding except the ceramic-to-metal seal sub-assembly 122. The major sub-assemblies, comprise the upper and lower end cap assemblies 122' and the integral emitter-collector trilayer assemblies 51. The most critical assembly is the establishment of accurate interelectrode spaces 38, which should be 0.008 inch. The fact that the sub-assemblies can be post weld machined provides uniformity of sub-assemblies plus repeatable stack height dimensions. The interelectrode spaces 38 are fixed on individual emitter/collector units as they are stacked in place for electron-beam welding.

From the above, it will be understood that useful electrical power is actually made available at the output terminals 35 of the multi-converter module 41 of this invention at high currents and relatively high voltages. The described combination converter 27 also has high efficiency. For example, with suitable thermal and electrical shields 123 and 125 efficiencies of up to 12 percent or more have actually been obtained.

This invention has the advantage of providing an improved trilayer bonding method by vacuum casting an $Al_2O_3$ electrical insulator between two molybdenum cylinders. This invention also has the advantage of providing improved thermionic diode structures, comprising stacked diodes, flexible leads that connect the diodes in series, and an improved thermionic multi-converter module.

What is claimed is:

1. A multi-converter thermionic energy module, comprising a heat pipe, thermionic diodes having emitters and collectors formed from cylinders arranged around and insulated from said heat pipe and each other by aluminum oxide electrical insulators forming alumina tri-layers substantially without bubbles, voids, gas pockets and porosity therein, and flexible overlapping slotted lead means connecting said diodes in series by providing in said lead means spiral slots that overlap by about 50 percent, said lead means thereby optimizing the area to length ratio of said lead means at a low thermal drain between said diodes while providing axial movement and differential expansion between said collectors and emitters and the communication of a gas between said emitters and collectors of respective of said diodes in response to heat energy supplied to said diodes from said heat pipe for directly converting said heat energy to electricity in said diodes.

2. The module of claim 1 in which said lead means form spiral slots therein for optimizing the area-to-length ratio of said lead means for providing adequate cross-sectional area for electrical conductivity between said diodes connected in series by said lead means while providing low thermal drain between said diodes to enhance converter efficiency.

3. The module of claim 1 having emitters and collectors uniformly spaced from concentric refractory cylinders by a uniformly cast alpha phase aluminum oxide insulator without voids, bubbles, gas pockets and porosity.

4. The module of claim 1 having emitters uniformly spaced from said heat pipe by refractory cylinders bonded to said emitters by a uniformly cast, alpha phase, aluminum oxide dielectric without voids, bubbles, gas pockets and porosity whereby said refractory cylinders thermally connect said heat pipe to said emitters, and said dielectrics insulate said emitters from said heat pipe.

5. The module of claim 1 in which said diodes are selectively stacked in series on said heat pipe to produce a predetermined voltage output corresponding to the number of said diodes stacked on said heat pipe.

6. The module of claim 1 wherein said module has adjacent electrode surfaces formed with an arc-suppression coating thereon to prevent arc-over therebetween.

* * * * *